US007254002B2

(12) United States Patent
Aemireddy

(10) Patent No.: US 7,254,002 B2
(45) Date of Patent: Aug. 7, 2007

(54) REVERSE CONDUCTION PROTECTION METHOD AND APPARATUS FOR A DUAL POWER SUPPLY DRIVER

(75) Inventor: Arvind Reddy Aemireddy, Inver Grove Heights, MN (US)

(73) Assignee: Agere Systems Inc., Allentown, PA (US)

( * ) Notice: Subject to any disclaimer, the term of this patent is extended or adjusted under 35 U.S.C. 154(b) by 446 days.

(21) Appl. No.: 10/706,467

(22) Filed: Nov. 12, 2003

(65) Prior Publication Data

US 2005/0099748 A1 May 12, 2005

(51) Int. Cl.
*H02H 3/20* (2006.01)
*H02J 1/10* (2006.01)

(52) U.S. Cl. ............................ 361/84; 307/51; 307/71; 307/80; 307/85

(58) Field of Classification Search .................. 307/51, 307/71, 80, 85; 361/82, 84
See application file for complete search history.

(56) References Cited

U.S. PATENT DOCUMENTS

2002/0167771 A1* 11/2002 Kamiya ........................ 361/84
2004/0140719 A1* 7/2004 Vulih et al. .................... 307/80

* cited by examiner

*Primary Examiner*—Brian Sircus
*Assistant Examiner*—Hal I. Kaplan

(57) ABSTRACT

The invention is a dual stage power supply with a protection circuit for preventing reverse conduction through the lower voltage driver of the dual stage power supply and excess power dissipation when the higher voltage driver is on. In one embodiment of the invention, the protection scheme comprises a comparator that detects when the voltage on the output pad exceeds a predetermined voltage and a protection transistor which is controlled by the comparator to block reverse conduction through the lower voltage driver when the higher voltage driver is operating.

14 Claims, 4 Drawing Sheets

200

400

REVERSE CONDUCTION PROTECTION METHOD AND APPARATUS FOR A DUAL POWER SUPPLY DRIVER

FIELD OF THE INVENTION

The invention relates to integrated circuits with dual power supplies at different voltage levels.

BACKGROUND OF THE INVENTION

Integrated circuits typically operate with power supplies of 5 volts or less and often must drive signals of a particular voltage level on-chip or off-chip. Merely as an example, an integrated circuit pre-amplifier may have a plurality of driver circuits for driving signals off-chip. For instance, an eight bit amplifier for driving eight signals off-chip might have eight driver circuits having an output stage like the output stage 101 shown in FIG. 1 for driving an off-hip load 102 through an output pad 104 of the integrated circuit. FIG. 1 shows only the output stage of the driver circuit in detail. The input signal source, $V_{IN}$, that is to be driven onto the load 102 is supplied to one input terminal of an operational amplifier 105.

In the output stage 101, an output transistor M17 has its source coupled to a voltage rail 113, in this case 5 volts, and its drain coupled to node 107. Its gate is coupled to the output of the operational amplifier 105. Transistor M16 has its source coupled to the voltage rail 113, and its drain and gate coupled together to the gate of output transistor M17 and the output of the operational amplifier 105. Transistors M16 and M17 in this circuit are configured as a current mirror that essentially delivers current controlled by the operational amplifier 105 to the load. The input signal VIN is supplied to one input terminal of the operational amplifier and the other input terminal is coupled to the junction 110 of voltage divider 109 comprising resistors R0 and R1. Since an operational amplifier operates to drive the voltages at its two inputs to the same voltage, operational amplifier 105 drives the junction 110 between resistors R0 and R1 to VIN. The voltage at the output pad 104 is dependent on the input voltage, VIN, and the ratio of resistors R0 and R1. Specifically, with this configuration, the output voltage on pad 104 is ((R0+R1)/R1)*VIN. The current through the load 102 is dictated by the voltage placed on pad 104 and the resistance, $R_{ext}$, of the load 102. This type of architecture is efficient in that it generates maximum output voltage because the only voltage drop from the rail is the $V_{ds}$ of M17. So the output voltage can go to a maximum value of $VCC-V_{dsM17}$.

Transistor M15 has its current flow terminals (source and drain) coupled between the drain of output transistor M17 and the load 102. The source is coupled to the drain of transistor M17 at node 107 and the drain is coupled to the output node 104. A voltage divider 109 is coupled between the output node 104 and ground with the divided voltage supplied to the second input of the operational amplifier 105. Transistor M15 acts as a source follower at lower output voltages, preventing the Vds breakdown of transistor M17. At higher output voltages, transistor M15 acts as a pass gate, whereby the output voltage on node 104 follows the voltage at node 107 between transistors M15 and M17. This driver circuit should produce a very good output voltage range of about 0 to 4.5 volts.

In a multi-bit preamplifier circuit, (8-bit, for example) a single, “selected” driver typically drives the load over the full output range (e.g., about 0-4.5 volts), while the seven remaining, “unselected” drivers only need to drive their external loads to very low voltages (e.g., 0-1.5 volts). In such conditions, most of the excess voltage from the various drivers is dropped inside the chip. For example, if the unselected loads are to be driven to only 1 volt, then Vcc (5 volts)−1 volt=4 volts will be dropped inside the chip for each of the 7 unselected drivers. With seven drivers dumping 4 volts each on-chip, power dissipation on-chip can be quite substantial.

In many situations, e.g., when such circuits are employed in battery-powered devices, such as cellular telephones, PDAs (Personal Digital Assistants), and portable digital audio or video recording and playing devices, it is particularly desirable to minimize wasted power.

SUMMARY OF THE INVENTION

The invention is a dual power supply driver with a protection circuit for eliminating wasted power dissipation by preventing reverse conduction through the lower voltage power supply driver when the higher voltage power supply driver is driving a higher voltage signal to the output. In one embodiment of the invention, the protection circuit comprises a protection transistor interposed between the output transistor of the lower voltage power supply driver and the output node to which both power supplies are coupled. The protection transistor is turned off under control of a comparator to prevent reverse conduction through the output stage of the lower voltage power supply driver when a high voltage is present on the output node. Specifically, the comparator detects the voltage on the output node and turns off the protection transistor when that voltage exceeds a predetermined level.

DETAILED DESCRIPTION OF THE INVENTION

Figure 1:
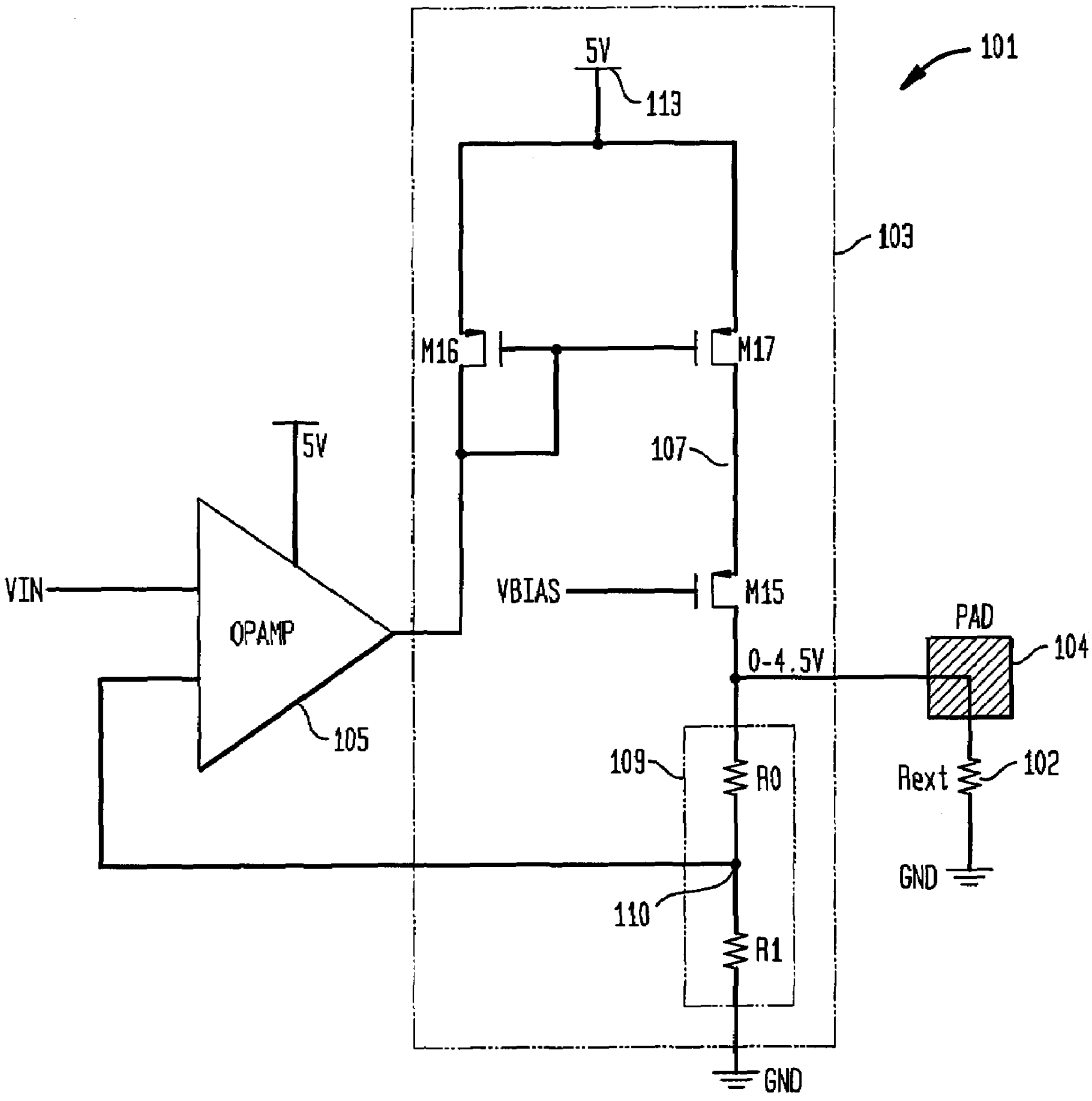
FIG. 1 (PRIOR ART)
FIG. 1 is a circuit diagram of an output stage of a driver circuit of the prior art.

One technique to reduce power dissipation on the chip involves providing a dual power supply comprising a first, higher voltage driver (e.g., 5 volts) and a second, lower voltage driver (e.g., 2.5 volts). When a particular pad (0, 1 . . . 7) is selected, the 5 volt power supply driver is turned on and the 2.5 volt power supply driver is turned off for the selected pad. At the remaining, unselected pads, the 5 volt power supply drivers are turned off and the 2.5 volt power supply drivers are turned on at all unselected pads. This two stage scheme substantially reduces the wasted power dissipation on the chip because a 2.5 volt supply driver instead of 5 volt supply driver can still provide 1 volt across the load, while dumping only 2.5 volts−1 volt=1.5 volts per unselected driver, instead of 4 volts per unselected driver, inside the chip.

However, because both the 5 volt power supply driver and the 2.5 volt power supply driver are coupled to the same node, e.g., output pad 104, the output voltage being driven onto the output pad by the 5 volt driver is presented at the output terminal of the 2.5 volt driver. If the 5 volt driver is driving the output pad 104 to a voltage greater than 2.5+ the threshold voltage of the transistor in the 2.5 volt power supply that is between the output pad and the 2.5 volt rail, it will cause reverse conduction from the 5 volt rail through output pad 104 to the 2.5 volt rail through the 2.5 volt power supply driver, causing unwanted power dissipation.

Figure 2:
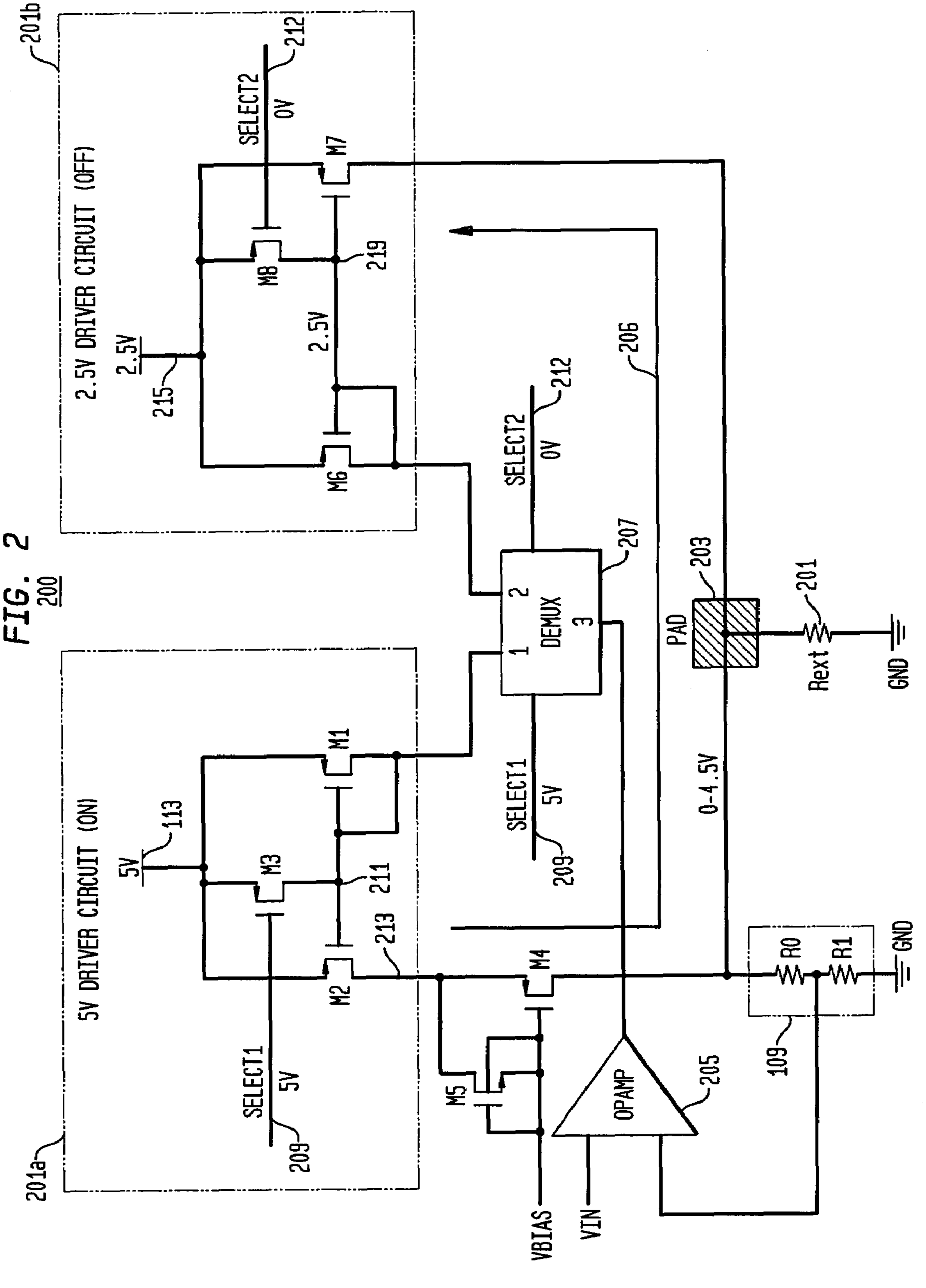
FIG. 2 is a schematic diagram of a two stage driver circuit.

FIG. 2 is a circuit diagram of an output stage 200 of an exemplary dual stage driver circuit as outlined above. The output load is represented by resistor 201. The output pad is shown at 203. The signal source, $V_{IN}$, is applied at the input of operational amplifier 205, the output of which is provided to a demultiplexer 207. The demultiplexer 207 provides the output of the operational amplifier 205 to either the 5 volt driver circuit 201*a* or the 2.5 volt driver circuit 201*b*.

The 5 volt driver circuit 201*a* is largely identical to the 5 volt driver circuit shown in FIG. 1, except for the addition of transistor M3 and demultiplexer 207 to select or deselect the 5 volt driver circuit 201*a* depending on the state of the select/deselect signal 209. Specifically, the 5 volt driver is selected/deselected by a SELECT1 signal 209 that controls both the demultiplexer 207 and transistor M3. Transistor M3 is a PMOS switch transistor with its source and drain coupled between the 5 volt rail and the gates of transistors M1 and M2. The 5 volt driver 201*a* is selected when SELECT1 goes high to 5 volts. This causes the demultiplexer 207 to send the output of the operational amplifier 205 to the 5 volt driver circuit 201*a* through demultiplexer output terminal 1. The SELECT1 control signal going high also turns off select transistor M3 so that the inputs to the gates of the current mirror transistors M1 and M2 are driven solely by the amplified $V_{IN}$ signal, whereby the current through the current flow terminals of transistor M2 is controlled by $V_{IN}$.

To deselect the 5 volt driver 201*a* (i.e., the 2.5 volt driver 201*b* is selected), SELECT1 goes low to 1.7 volts, thus, turning transistor M3 on. This ties node 211 at the gates of the current mirror transistors M1 and M2 to the 5 volt rail through transistor M3, thus turning off transistor M2 (its source and gate are essentially tied together through transistor M3 in this state) so that it does not driver a current out to the load through M4.

In addition, a diode clamp M5 has been added to protect M2 from potentially breaking down when the 5 volt driver 201*a* is deselected. Specifically, node 213 between the drain of transistor M2 and the source of transistor M4 would float if not for the diode clamp M5 and could float to a voltage that could cause Vds breakdown of transistor M2. M5 is an NMOS transistor with its source and gate tied to its tub (i.e., the p-doped well in the substrate within which an NMOS transistor is typically fabricated) and to a bias voltage $V_{BIAS}$. This configuration permits transistor M5 to operate as a diode from the drain terminal to the tub, thus preventing node 213 from floating when transistor M2 is off.

All of the PMOS transistors have their tubs coupled to the 5 volt rail.

With respect to the 2.5 volt driver circuit 201*b*, transistor M7 has its current flow terminals coupled between the 2.5 volt rail 215 and the output pad 203. Transistors M6 and M7 form a current mirror. Specifically, transistor M6 has its current flow terminals coupled between the 2.5 volt rail 215 and the demultiplexer 207. The gates of transistors M6 and M7, respectively, are coupled together at node 219, which node also is coupled to the drain of transistor M6.

Transistor M8 is the counterpart of transistor M3 of the 5 volt driver circuit 201*a*. Specifically, it is a PMOS transistor with its source and drain coupled between the 2.5 volt rail 215 and the gates of current mirror transistors M6 and M7. The 2.5 volt driver 201*b* is selected when SELECT2 signal 212 goes high to 2.5 volts and is deselected when SELECT2 goes low to 0 volts. Similarly to M3 in the 5 volt driver, when SELECT2 goes high, it causes the demultiplexer 207 to send the output of the operational amplifier 205 to the 2.5 volt driver circuit 201*b* through demultiplexer output terminal 2 and also turns off transistor M8 so that the inputs to the gates of the current mirror transistors M6 and M7 are driven solely by the operational amplifier.

To deselect the 2.5 volt driver, SELECT2 goes low to 0 volts, thus, turning transistor M8 on. This ties node 219 to the 2.5 volt rail 215 through transistor M8, thus turning off transistor M7 so that it does not drive a current out to the load 203.

All of the transistors M6, M7, and M8 in the 2.5 volt driver are PMOS transistors with their tubs tied to 5 volts.

Figure 3:
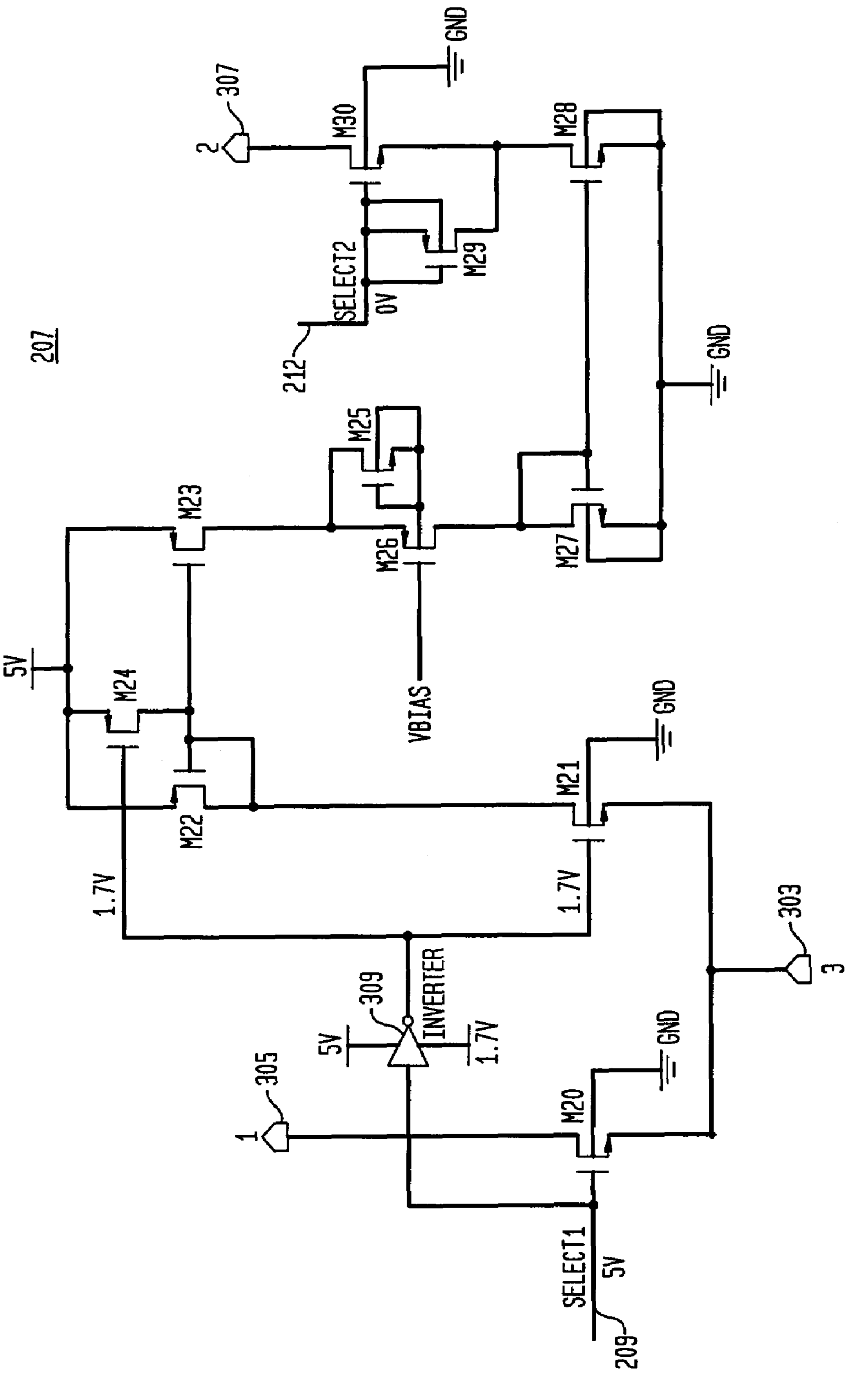
FIG. 3 is a schematic diagram of the demultiplexer for a two stage driver in accordance with the present invention.

FIG. 3 is a schematic of the demultiplexer 207 of FIG. 2. The demultiplexer input terminal 303 is coupled to the output of the operational amplifier 205. The first output terminal 305 is the output terminal to the 5 volt driver 201*a* and the second output terminal 307 is the output terminal to the 2.5 volt driver 201*b*. M20 and M21 are NMOS switch transistors with their tubs tied to circuit ground and are both controlled by the SELECT1 signal. Particularly, M20 is the switch that couples the demultiplexer input terminal to the first demultiplexer output terminal, thus coupling the operational amplifier output 205 to the 5 volt driver stage 201*a*. M20 has its gate directly coupled to SELECT1. M21 is the switch transistor that couples the demultiplexer input to the second demultiplexer output terminal, thus coupling the operational amplifier output 205 to the 2.5 volt driver stage 201*b* through a PMOS current mirror (M22, M23), a cascode transistor (M26), an NMOS current mirror (M27, M28) and a second switch transistor M30 controlled by the SELECT2 control signal.

More particularly, M21 has its gate coupled to SELECT1 through an inverter 309, which switches between 5 volts and 1.7 volts logic levels. SELECT1 also is coupled through inverter 309 to the gate of transistor M24. M24 is a switch that turns transistors M22 and M23 off when SELECT1 is low (i.e., the 5 volt driver stage is unselected). Transistors M22 and M23 form a PMOS current mirror and M26 is a cascode device for the mirror. Cascode transistor M26 is protected by NMOS diode clamp M25 having its gate, source, and tub tied together and coupled to a bias voltage $V_{BIAS}$. Transistors M27 and M28 form an NMOS current mirror with the transistors having their source terminals coupled to their tubs. Transistor M30 is a NMOS switch controlled by the SELECT2 signal. M30 is protected by PMOS diode clamp M29 having its gate, source and tub tied together and coupled to SELECT2. As previously noted, SELECT1 and SELECT2 are complements of each other, with SELECT1 switching between 1.7 volts and 5 volts and SELECT2 switching between 0 volts and 2.5 volts.

When SELECT1 is high (5 volts) and SELECT2 is low (0 volts), M20 is on and M21 is off such that the demultiplexer input is coupled through M20 through the first demultiplexer output terminal to the 5 volt driver stage and the second demultiplexer output terminal is off (i.e., M30 is off). When SELECT1 is low (1.7 volts) and SELECT2 is high (2.5 volts), M20 is off and M21 is on such that the demultiplexer input is instead coupled to the second demultiplexer output terminal through the PMOS current mirror (M22, M23), cascode transistor M26, NMOS current mirror (M27, M28), and the current flow terminals of switch transistor M30. M30 is on by virtue of SELECT2 being high.

Although the circuit shown in Figures considerably reduces power dissipation on chip relative to the circuit shown in FIG. 1, it still suffers from the drawback of reverse conduction. For instance, when the 5 volt driver is selected, depending on $V_{IN}$, the 5 volt driver stage 201*a* will drive the output pad to somewhere between 0 and about 4.5 volts. The drain of transistor M7 in the 2.5 volt driver stage 201*b* is coupled to the output pad 203. When the 5 volt driver stage 201*a* is on and the 2.5 volt driver stage 201*b* is off, transistor M7 will remain off as long as the voltage driven onto the output pad 203 (which is coupled directly to the drain terminal of output transistor M7) remains below about 3.2 volts, i.e., 2.5 volts plus the threshold voltage (about 0.7 volts) of transistor M7.

However, when the 5 volt driver stage 201*a* applies a voltage at the output pad 203 greater than 3.2 volts, that voltage on the drain terminal of transistor M7, will cause transistor M7 to conduct in the reverse direction as illustrated by arrow 206. This is a source of unwanted power dissipation in the circuit.

Figure 4:
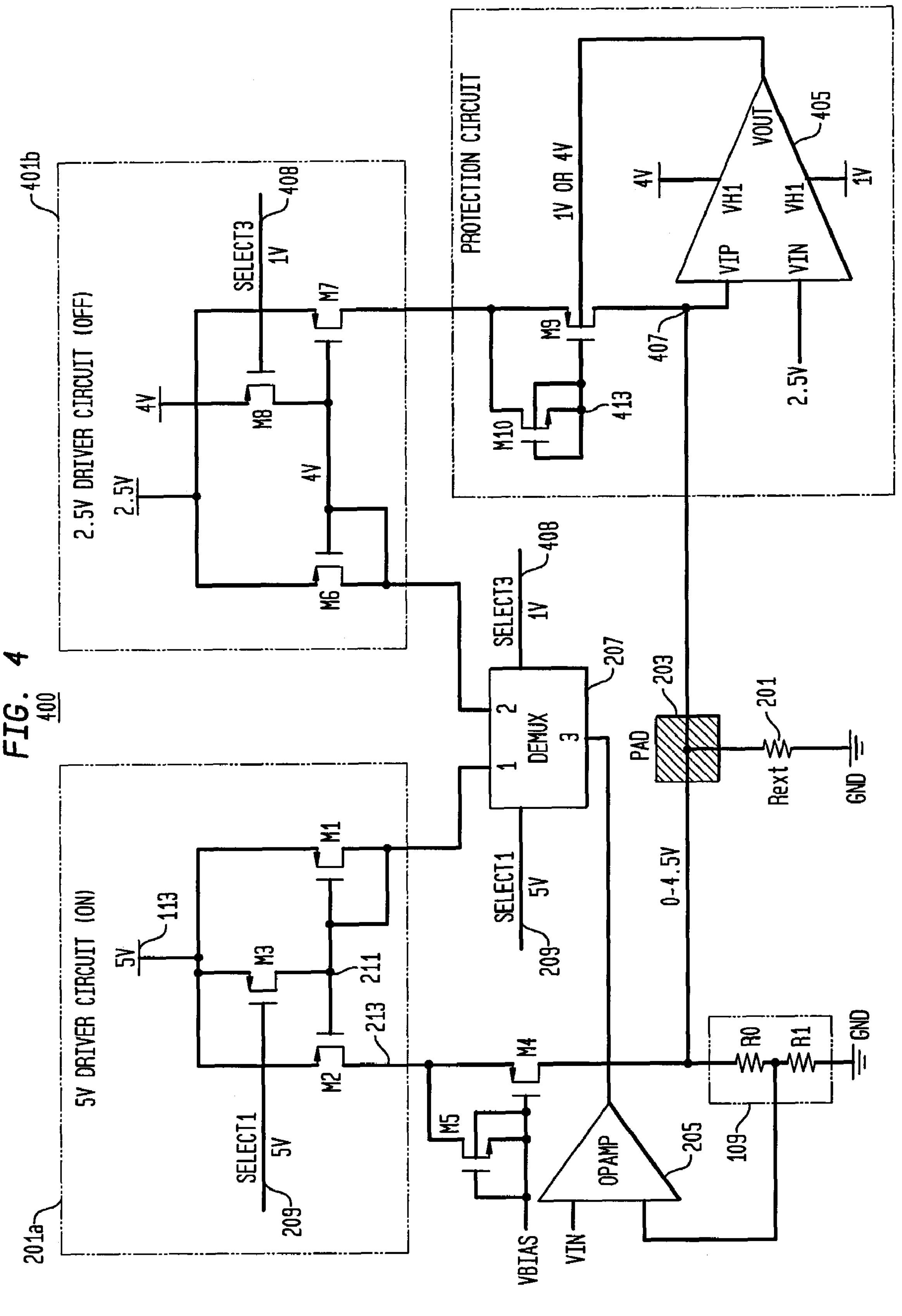
FIG. 4 is a circuit diagram of the output stage of the lower voltage driver of a dual driver circuit in accordance with one embodiment of the present invention.

FIG. 4 is a circuit diagram of a modified output stage 400 for a dual driver circuit in accordance with the present invention. This circuit prevents reverse conduction in the output stage 401*b* of the lower voltage (e.g., 2.5 volt) driver circuit. Relative to the circuit shown in FIGS. 2 and 3, the following components have been added. Cascode protection transistor M9 has been added between the drain of output transistor M7 and the output pad 203. Particularly, the source of cascode protection transistor M9 is coupled to the drain of output transistor M7 and the drain of transistor M9 is coupled to the output pad 203. In addition, transistor M10 has been added as a diode clamp for transistor M9. Its source and gate are tied together and coupled to the tub of transistor M10. This node is further coupled to the gate of cascode protection transistor M9 and the output of a comparator 405 (described below). Its drain is coupled to the source of protection transistor M9 at the node between the source terminal of transistor M9 and the drain terminal of output transistor M7. Transistor M10 is a diode clamp similar to transistor M5 in the 5 volt driver circuit 201*a* and will be explained in further detail below.

Other changes include that the source of switch transistor M8 has been uncoupled from the 2.5 volt rail 215 and coupled to a 4 volt rail. Likewise, logic levels for the select control signal to the gate of transistor M8 and the demultiplexer are changed to 1 volt to turn the 2.5 volt driver off and 4 volts to turn it on, instead of 0 and 2.5 volts, respectively. Accordingly, in FIG. 4, the SELECT2 control signal of FIGS. 2 and 3 are replaced with a SELECT3 control signal 408 to reflect the changes in voltage levels. SELECT3 is still the complement of SELECT1.

Finally, a comparator 405 has been added. The output of comparator 405 is coupled to the node 413 at the junction of the gate of transistor M9, the gate, source and the tub of transistor M10. The non-inverting input of comparator 405 is coupled to the node 407 joining the drain terminal of transistor M9 to the output pad 203. The inverting input of the comparator 405 is coupled to a 2.5 voltage reference. The comparator output voltage levels are 1 volt and 4 volts, respectively.

The high voltage driver (e.g., the 5 volt driver) 201*a* and the demultiplexer 207 are essentially unchanged.

In operation, when the 5 Volt driver 201*a* is off and the 2.5 Volt driver 401*b* is on, the voltage range at the output pad 203 will be about 0-1.5 volts. Since the output pad 203 is coupled to the non-inverting input of the comparator 405, the comparator 405 will apply 1 volt to the gate of cascode protection transistor M9 whenever the 2.5 volt driver 201*b* is on and the 5 volt driver 201*a* is off. This turns on cascode protection transistor M9 so that the output of transistor M7 will be passed through the current flow terminals (source and drain) of transistor M9 to the output pad 203, providing normal operation generally as previously described. However, when the 5 volt driver is on and the 2.5 volt driver is off and the voltage placed on the output pad 203 exceeds the 2.5 volts threshold of the comparator, the comparator output will switch to 4 volts. This voltage applied at the gate of transistor M9 will turn off the transistor. The voltage at the drain of transistor M9 is the voltage on the output pad 203, which will be somewhere between 0 volts and the 4.5 volt maximum drive voltage of the 5 volt driver. Since the maximum possible voltage at the drain of transistor M9 is 4.5 volts, which is only 0.5 volts higher than the 4 volts applied at the gate of transistor M9, M9 cannot turn on (because the threshold voltage of transistor M3 is at least 0.5 volts, and usually about 0.7 volts). Accordingly, reverse conduction through output transistor M7 is not possible because the path from the output pad 203 to output transistor M7 is open circuited by M9.

The diode clamp transistor M10 is included to prevent node 411 from floating when the protection circuit is operating and no current is flowing through node 411 (i.e., when M9 is turned off). If not for the diode clamp M10, node 411 could float to any voltage (even to 0 volts) without current flowing, which could lead to gate breakdown of M7. Particularly, the Vds and gate oxide breakdown voltage for transistors fabricated by 3.5 volts CMOS fabrication techniques is 3.5 volts. Thus, if the gate of M9 is at 4 volts and node 411 floats to 0 volts, gate oxide breakdown will occur in output transistor M7. Thus, the diode clamp M10 is coupled between the gate and the source of the protection transistor M9 to keep the node 411 between the protection transistor M9 and the output transistor M10 from floating when no current is flowing.

As noted above, the bias voltage applied to the source of switch transistor M8 should be 4 volts instead of 2.5 volts (as it was in the prior art circuit of FIG. 2.) Furthermore, the SELECT3 logic levels applied at the gate of switch transistor M8 should be 1 volt to turn the 2.5 volt driver off and 4 volts to turn it on, instead of 0 volts and 2.5 volts, respectively.

Specifically, with diode clamp M10 in place, when transistor M9 is off with no current flowing, node 411 will be at 4 volts. Therefore, in order to keep output transistor M7 off when transistor M9 is off, the gate voltage of M7 also must be maintained at about 4 volts. More broadly, the bias voltage at the source of M8 should be no further away from the 4 volts supplied from the comparator output than one threshold voltage of M7. This is why the source and gate of transistor M8 is coupled to a 4 volt rail (rather than the 2.5 volt rail as in prior art FIG. 2). Thus, in turn, the SELECT3 voltage applied at the gate of transistor M8 to turn it on should switch between 4 volts and 1 volt, rather than 2.5 volts and 0 volts, in order to prevent the voltage differential between the source and gate of PMOS transistor M8 from exceeding the junction breakdown voltage of transistor M8 when SELECT3 is unselected (i.e., when SELECT3 is low).

In the circuit of FIG. 4, all of the PMOS transistors have their tubs tied to the 5 volt rail.

This protection scheme comprises minimal additional circuitry and prevents unnecessary power dissipation on the chip when the higher voltage driver is on and the lower voltage driver is off.

Having thus described one particular embodiment of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A protection circuit for preventing reverse conduction through a lower voltage driver that is coupled to a first node when a higher voltage driver coupled to the first node is driving the first node to a voltage higher than the maximum voltage of the lower voltage driver, wherein the lower voltage driver includes an output stage having a first transistor having a first current flow terminal coupled to a lower voltage rail and a second current flow terminal coupled to drive the first node, the circuit comprising:

a second transistor having a first current flow terminal coupled to the second current flow terminal of the first transistor and a second current flow terminal coupled to the first node, and further having a control terminal;

a comparator coupled to detect when a voltage on the first node exceeds the voltage of the lower voltage rail, the comparator having an output coupled to the control terminal of the second transistor and configured to turn the second transistor off if the voltage on the first node exceeds the voltage of the lower voltage rail; and a diode clamp coupled between the control terminal and the first current flow terminal of the second transistor.

2. The circuit of claim 1 wherein the comparator has a first input coupled to the first node and a second input coupled to the lower voltage rail.

3. The circuit of claim 1 wherein the circuit is constructed of CMOS components.

4. The circuit of claim 1 wherein the diode clamp comprises a third transistor having a first current flow terminal and a control terminal coupled to the control terminal of the second transistor and a second current flow terminal coupled to the first current flow terminal of the second transistor.

5. The circuit of claim 4 wherein the first current flow terminal and the control terminal of the third transistor are also coupled to a tub of the third transistor.

6. The circuit of claim 5 wherein the comparator is configured to output a first voltage level when the voltage on the first node is less than the voltage of the lower voltage rail and to output a second voltage level when the voltage on the first node is greater than the voltage of the lower voltage power rail.

7. The circuit of claim 6 wherein the first transistor also has a control terminal, the circuit further comprising:

a fourth transistor having first and second current flow terminals coupled between the control terminal of the first transistor and a first fixed voltage, the fixed voltage being within one transistor threshold voltage of the second output voltage of the comparator.

8. The circuit of claim 7 wherein the fourth transistor further comprises a control terminal coupled to a select control signal that is at a first voltage when said lower voltage driver is to drive said first node and is at a second voltage when said higher voltage driver is to drive said first node, the second select control signal voltage being within one transistor breakdown voltage of the first fixed voltage.

9. An output stage for a lower voltage driver of a dual stage power supply circuit having protection from reverse conduction through the output stage when a higher voltage driver is driving a common output node of the lower voltage driver and the higher voltage driver to a voltage higher than the maximum voltage of the lower voltage driver, the output stage comprising:

a voltage rail;

a first transistor having a first current flow terminal coupled to the voltage rail and a second current flow terminal coupled to drive the output node;

a second transistor having a first current flow terminal coupled to the second current flow terminal of the first transistor and a second current flow terminal coupled to the output node, and further having a control terminal;

a comparator coupled to detect when a voltage on the output node exceeds the voltage of the voltage rail, the comparator having an output coupled to the control terminal of the second transistor and configured to turn the second transistor off if the voltage on the output node exceeds the voltage of the voltage rail; and a diode clamp coupled between the control terminal and the first current flow terminal of the second transistor, wherein the diode clamp comprises a third transistor having a first current flow terminal, a control terminal, and a tub coupled to the control terminal of the second transistor and a second current flow terminal coupled to the first current flow terminal of the second transistor.

10. The output stage of claim 9 wherein the comparator has a first input coupled to the output node and a second input coupled to the voltage rail, the comparator being configured to output a first voltage level when the voltage on the output node is less than the voltage of the voltage rail and to output a second voltage level when the voltage on the output node is greater than the voltage of the voltage rail.

11. The output stage of claim 10 wherein the first transistor also has a control terminal coupled to an input signal source;

the output stage further comprising:

a fourth transistor having first and second current flow terminals coupled between the control terminal of the first transistor and a first fixed voltage, the first fixed voltage being within one transistor threshold voltage of the second output voltage of the comparator, the fourth transistor further comprising a control terminal coupled to a select control signal that is at a first voltage when said lower voltage driver is to drive said first node and is at a second voltage when said higher voltage driver is to drive said first node, the second select control signal voltage being within one transistor breakdown voltage of the first fixed voltage; and a fifth transistor having a first current flow terminal and a control terminal coupled together to the input signal source and the control terminal of the first transistor and having a second flow terminal coupled to the lower voltage rail.

12. A dual stage power supply comprising:

a first, higher voltage power supply driver coupled to an output node; and a second, lower voltage power supply driver coupled to the output node, the second power supply driver comprising:

an input signal source;

a voltage rail;

a first transistor having a first current flow terminal coupled to the voltage rail and a second current flow terminal coupled to drive the output node;

a second transistor having a first current flow terminal coupled to the second current flow terminal of the first transistor and a second current flow terminal coupled to the output node, and further having a control terminal;

a comparator coupled to detect when a voltage on the output node exceeds the voltage of the lower voltage rail, the comparator having an output coupled to the control terminal of the second transistor and configured to turn the second transistor off if the voltage on the output node exceeds the voltage of the voltage rail; and a diode clamp coupled between the control terminal and the first current flow terminal of the second transistor, wherein the diode clamp comprises a third transistor having a first current flow terminal, a control terminal, and a tub coupled to the control terminal of the second transistor and a second current flow coupled to the first current flow terminal of the second transistor.

13. The output stage of claim 12 wherein the comparator has a first input coupled to the output node and a second input coupled to the voltage rail, the comparator being configured to output a first voltage level when the voltage on the output node is less than the voltage of the voltage rail and to output a second voltage level when the voltage on the output node is greater than the voltage of the voltage rail.

14. The dual stage power supply of claim 13;

wherein the first transistor also has a control terminal;

the dual stage power supply further comprising;

a fourth transistor having first and second current flow terminals coupled between the control terminal of the first transistor and a first fixed voltage, the first fixed voltage being within one transistor threshold voltage of the second output voltage of the comparator, the fourth transistor further comprising a control terminal coupled to a select control signal that is at a first voltage when said lower voltage driver is to drive said output node and is at a second voltage when said higher voltage driver is to drive said output node, the select control signal second voltage being within one transistor breakdown voltage of the first fixed voltage; and a fifth transistor having a first current flow terminal and a control terminal coupled together to the input signal source and the control terminal of the first transistor and further having a second current flow terminal coupled to the lower voltage rail.

* * * * *